United States Patent [19]
Takashima

[11] Patent Number: 5,708,662
[45] Date of Patent: Jan. 13, 1998

[54] TRANSMISSION METHOD AND RECEIVING APPARATUS OF EMERGENCY INFORMATION WHICH IS FREQUENCY-MULTIPLEXED ON AN FM BROADCAST RADIO WAVE

[75] Inventor: Susumu Takashima, Tachikawa, Japan

[73] Assignee: Casio Computer Co., Ltd., Tokyo, Japan

[21] Appl. No.: 626,075

[22] Filed: Apr. 1, 1996

[30] Foreign Application Priority Data

| Apr. 7, 1995 | [JP] | Japan | 7-082448 |
| May 11, 1995 | [JP] | Japan | 7-113188 |
| May 11, 1995 | [JP] | Japan | 7-113189 |

[51] Int. Cl.$^6$ .......................................... H04J 3/12
[52] U.S. Cl. ............... 370/496; 370/527; 370/529
[58] Field of Search .................... 370/473, 480, 370/486, 487, 490, 493, 494, 495, 527, 529, 528, 351, 389, 431, 449, 450, 464, 465, 470, 471, 474, 496; 395/733, 734, 821, 849; 455/45, 70

[56] References Cited

U.S. PATENT DOCUMENTS

| 4,518,822 | 5/1985 | Martinez | 379/102 |
| 5,065,398 | 11/1991 | Takashima | 370/230 |
| 5,119,503 | 6/1992 | Mankovitz | 455/45 |
| 5,497,372 | 3/1996 | Nankoh et al. | 370/480 |
| 5,511,073 | 4/1996 | Padovani et al. | 370/471 |
| 5,572,201 | 11/1996 | Graham et al. | 340/902 |

*Primary Examiner*—Alpus H. Hsu
*Assistant Examiner*—Kwang Bin Yao
*Attorney, Agent, or Firm*—Frishauf, Holtz, Goodman, Langer & Chick

[57] ABSTRACT

A CPU enables an FM tuner, a tuning controller and an FM multiplex decoder, after which the CPU is disabled. The FM tuner, tuning controller and FM multiplex decoder receives frame data including emergency information transmitted from a broadcasting station. When a packet coincidence circuit determines that the received block is a specific block which may include emergency information, the FM multiplex decoder causes an emergency information determining circuit to determine if the associated packet contains emergency information. If this packet contains emergency information, the emergency information determining circuit sends an interrupt signal to the CPU to enable the CPU. The CPU then reproduces the emergency information in the received data and displays it on a display section.

16 Claims, 12 Drawing Sheets

| b1 | b2 | b3 | b4 | HEX | SERVICE ID | DATA PACKET STRUCTURE | RECEPTION MODE |
|---|---|---|---|---|---|---|---|
| 0 | 0 | 0 | 0 | 0 | UNDEFINED | - | - |
| 1 | 0 | 0 | 0 | 1 | TRANSFER NO.1 MODE | STRUCTURE 1 | SEQUENTIAL |
| 0 | 1 | 0 | 0 | 2 | TRANSFER NO.2 MODE | STRUCTURE 1 | RECORDING |
| 1 | 1 | 0 | 0 | 3 | TRANSFER NO.3 MODE | STRUCTURE 1 | RECORDING |
| 0 | 0 | 1 | 0 | 4 | TRANSFER NO.4 MODE | STRUCTURE 1 | RECORDING |
| 1 | 0 | 1 | 0 | 5 | TRANSFER NO.5 MODE | STRUCTURE 1 | RECORDING |
| 0 | 1 | 1 | 0 | 6 | TRANSFER NO.6 MODE | STRUCTURE 1 | RECORDING |
|   |   |   |   | ~ | - | - | - |
| 0 | 0 | 0 | 1 | 8 | EMERGENCY INFORMATION | STRUCTURE 1 | SEQUENTIAL |
|   |   |   |   | ~ | - | - | - |
| 1 | 0 | 1 | 1 | D | ADDED INFORMATION | STRUCTURE 2 | SEQUENTIAL/RECORDING |
| 0 | 1 | 1 | 1 | E | AUXILIARY SIGNAL | STRUCTURE 1 | RECORDING |
| 1 | 1 | 1 | 1 | F | OPERATION SIGNAL |  |  |

FIG.6

| BIC1 | : | 0001 | 0011 | 0101 | 1110 |
| BIC2 | : | 0111 | 0100 | 1010 | 0110 |
| BIC3 | : | 1010 | 0111 | 1001 | 0001 |
| BIC4 | : | 1100 | 1000 | 0111 | 0101 |

TRANSFER ORDER

TRANSMISSION METHOD AND RECEIVING APPARATUS OF EMERGENCY INFORMATION WHICH IS FREQUENCY-MULTIPLEXED ON AN FM BROADCAST RADIO WAVE

BACKGROUND OF THE INVENTION

1. Field of the Invention

The present invention relates to an emergency information transmission method and emergency information receiving apparatus, and, more particularly, to an emergency information transmission method which can reduce the consumed power of a receiving apparatus and an emergency information receiving apparatus capable of reducing the consumed power.

2. Description of the Related Art

There are various methods of urgently informing the prediction of the occurrence of an earthquake, the predicted occurrence of earthquake-originated tsunami or the like. For example, there have been proposed a TV receiver and radio receiver which inform emergency information while stopping the reproduction of the normal broadcasting upon reception of the emergency information. Also proposed are a TV receiver and radio receiver whose receiving sections are always powered on so that, upon reception of emergency information by the receiving sections, the whole receivers are activated to receive the emergency information.

FM character multiplexed broadcasting which multiplexes character data on an FM radio broadcast wave has been put to a practical use. Some attempts are being made to transmit emergency information using this FM character multiplexed broadcasting. Transmission data of FM character multiplexed broadcasting is comprised of frame data which includes, for example, 272 blocks. One frame data includes 190 data packets and 82 parity packets, and is capable of providing data of a total of 256 programs per broadcasting station. Any one of those programs can be used as emergency information.

A receiver which receives emergency information during the reception of the normal broadcast wave cannot receive emergency information even if being transmitted, when it is not receiving the normal broadcast wave, i.e., when a TV or radio is not in use. The receiver whose receiving section is always powered on suffers great consumed power. While the latter receiver does not raise a significant problem if it is a desk-top type using commercially available power or a car battery, this receiver, if it is a battery-operated portable type, is disadvantageous in that it cannot be used for a long period of time.

Moreover, the FM character multiplexed receiver capable of receiving emergency information should receive all the frame data to determine if a program for emergency information has been transmitted, and requires great consumed power.

SUMMARY OF THE INVENTION

Accordingly, it is an object of the present invention to provide an emergency information transmission method and emergency information receiving apparatus which suppress consumed power and can receive and inform emergency information.

To achieve the above object, according to one aspect of this invention, there is provided an emergency information transmission method for use in a data transmission system for transmitting frame data including a plurality of blocks, which method comprises the steps of:

preparing at least one block including emergency information;

transmitting a plurality of blocks prepared by said block preparing step, wherein each of said plurality of blocks includes data packets and parity packets, each data packet including prefix data for defining a content of data contained in said data packet and a data block containing data, and at a time of transmitting emergency information, predetermined data indicative of said emergency information is set in said prefix data and a data packet having said prefix data having said predetermined data set therein includes data for emergency transmission.

In receiving transmitted emergency information with this structure, it is possible to receive only a specific block, to determine if predetermined data is set in the prefix data of the received block, and to receive the emergency information when such predetermined data is set there. Therefore, the consumed power of the receiving apparatus can be suppressed.

According to another aspect of this invention, there is provided an emergency information receiving apparatus for receiving frame data including a plurality of blocks each including data packets and parity packets, at least one of said blocks including emergency information, and reproducing said emergency information included in said frame data, which apparatus comprises:

intermittent reception means for intermittently receiving a block of a specific number;

detection means for detecting predetermined data representing emergency information included in a data packet in said block received by said intermittent reception means; and emergency information output means for reproducing received data to output said emergency information when said detection means detects said predetermined data.

This emergency information receiving apparatus can receive only a specific block, determine if predetermined data is set in prefix data of the received block, and to receive the emergency information when such predetermined data is set there. Therefore, the consumed power of the receiving apparatus can be suppressed.

BRIEF DESCRIPTION OF THE DRAWINGS

FIG. 6 is a diagram illustrating the contents of a service ID code in prefix data which constitutes a part of a data packet;

DETAILED DESCRIPTION OF THE PREFERRED EMBODIMENTS

First Embodiment

One embodiment of the present invention will now be described with reference to the accompanying drawings.

To begin with, the principle of FM multiplexed broadcasting to which the emergency information receiving apparatus embodying this invention is adapted will be discussed.

Figure 1:
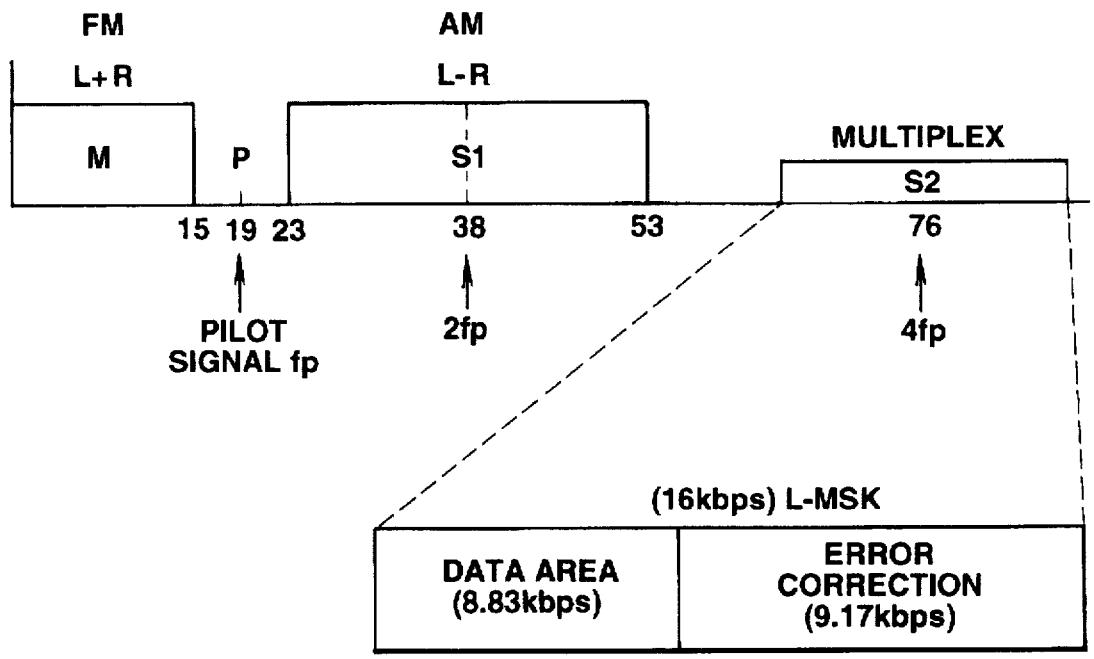
FIG. 1 is a diagram used to explain the principle of FM multiplexed broadcasting.

FIG. 1 illustrates the principle of such multiplexing of FM multiplexed broadcasting.

A sum signal ((L+R) signal; main channel signal) of a left (L) signal and right (R) signal and a difference signal ((L−R) signal) are prepared from L and R channel audio signals. Those signals are all limited to a frequency band of 15 KHz. A carrier which belongs to the difference signal ((L−R) signal) and has a frequency of 38 KHz, is subjected to carrier suppression amplitude modulation to prepare a subchannel signal. Then, the main channel signal, a pilot signal having a frequency of 19 KHz, and the subchannel signal are added together to prepare a stereo composite signal.

A multiplexed signal is in the frequency band where the baseband frequency is equal to or greater than 53 KHz and equal to or less than 100 KHz, and has a subcarrier frequency of 76 KHz, four times the frequency of the pilot signal. This multiplexed signal is subjected to L-MSK (Level controlled Minimum Shift Keying) modulation, and the resultant signal is frequency-multiplexed on the stereo composite signal.

Therefore, an FM broadcast wave with a carrier of a predetermined frequency frequency-modulated is acquired from a signal acquired by adding the main channel signal, pilot signal, subchannel signal and subcarrier frequency signal (multiplexed signal) together.

When the modulation level of the difference signal (L−R) signal) among audio signals is large, the interference on multiplexed signals increases. That is, the interference noise to audio signals is likely to be detected when the modulation of audio signals is small.

Figure 2:
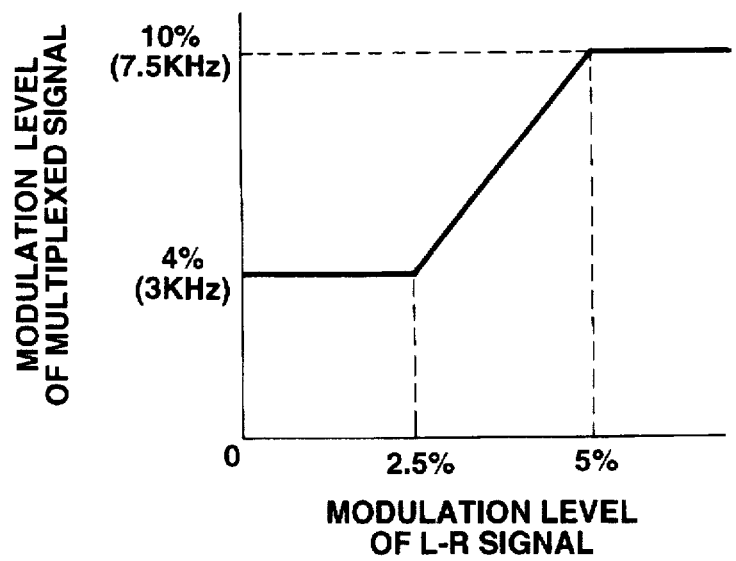
FIG. 2 is a diagram for explaining L-MSK modulation employed in FM multiplexed broadcasting.

In this respect, as shown in FIG. 2, the modulation level of the multiplexed signal is changed between 4% and 10% in accordance with the modulation level of the L−R signal.

The transfer rate of multiplexed signals is 16 Kbps of which 6.83 Kbps are used as a data area and the remaining 9.17 Kbps are used for error correction. Used in this error correction is a product code ((272, 190) shortened difference set cyclic code) obtained by breaking down a single code to symbols which are arranged in the horizontal and vertical directions.

Figure 3:
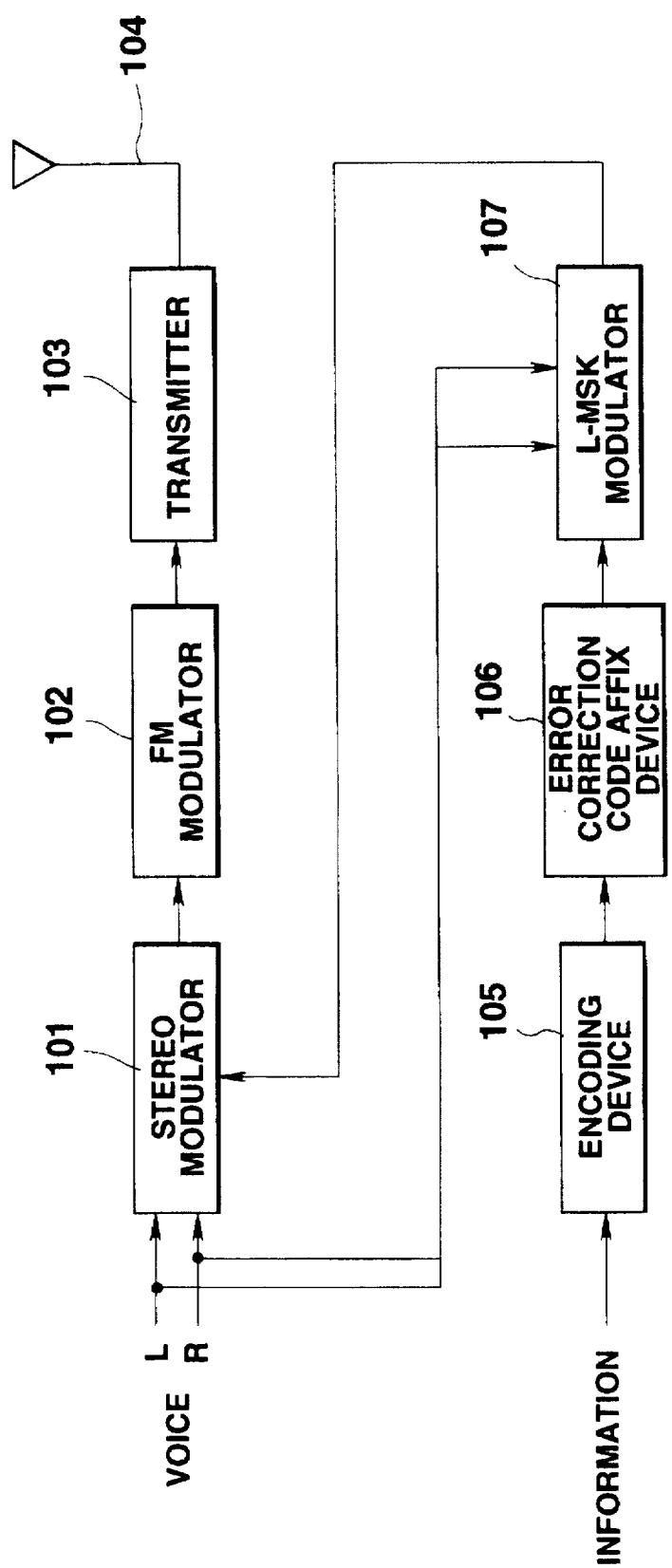
FIG. 3 is a diagram showing the structure of an FM multiplex transmitting apparatus used in FM multiplexed broadcasting.

FIG. 3 exemplifies the structure of an FM multiplex transmitting apparatus used in FM multiplexed broadcasting. This FM multiplex transmitting apparatus comprises a stereo modulator 101, an FM modulator 102, a transmitter 103, an antenna 104, an encoding device 105, an error correction code affix device 106 and an L-MSK modulator 107.

Figure 9:
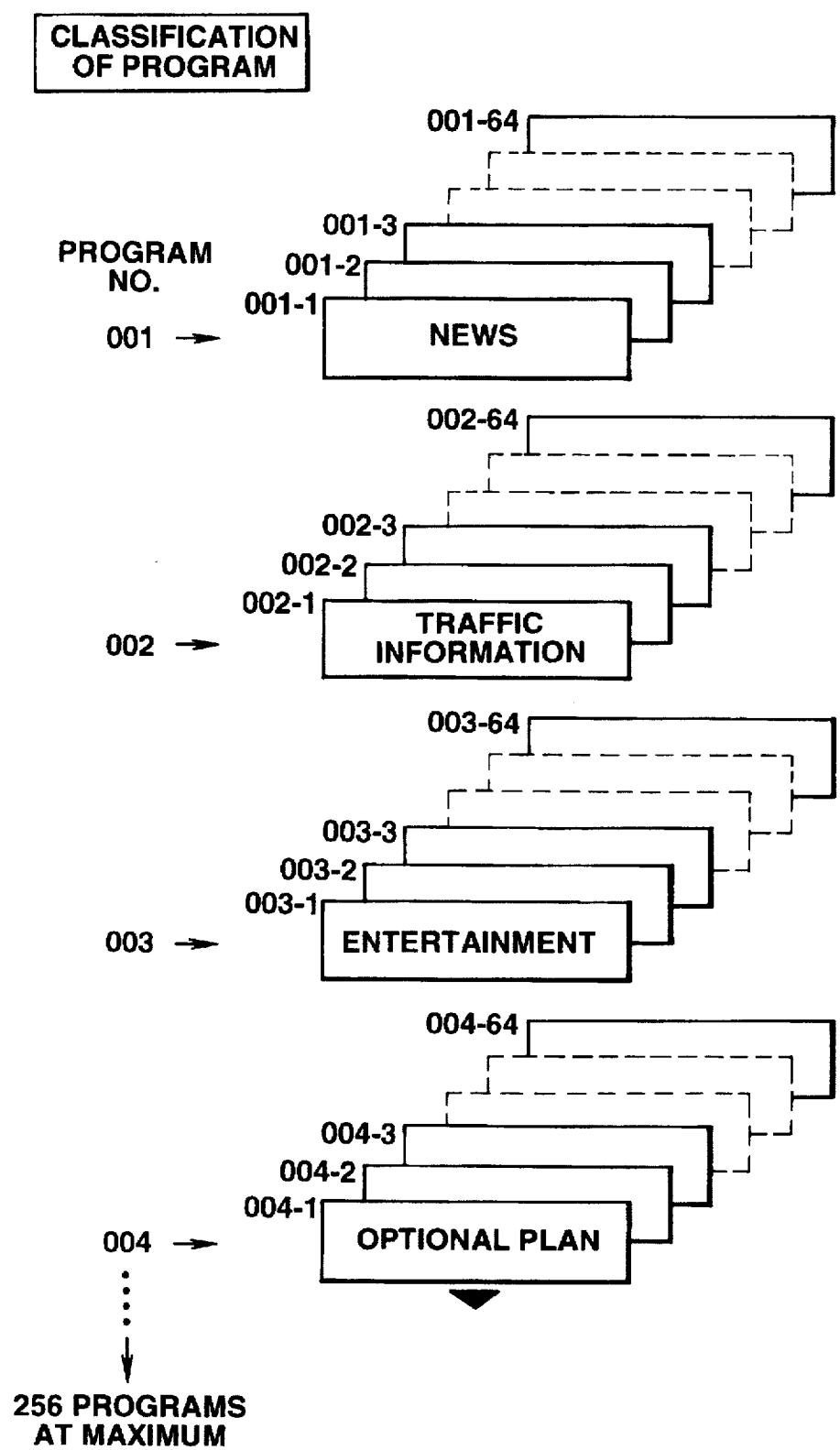
FIG. 9 is a diagram used to explain the relationship between program numbers and page numbers in prefix data which constitutes a part of a packet.

The encoding device 105 encodes, for example, program information as shown in FIG. 9 which will be discussed later. A maximum of 256 pieces of program information can be provided for each broadcasting station. Each program includes one page or a plurality of pages (64 pages at a maximum). Each page can contain 30 characters. The transfer rate for programs is approximately 823 pages per minute. In this embodiment, emergency broadcasting is assigned to the 255-th program.

Program information includes supplemental information for supplementing FM radio audio broadcasting as main broadcasting, such as the titles of broadcast music pieces, singer names, and request telephone numbers, and independent information such as weather forecast and traffic information, which are independent of the FM radio audio broadcasting. Further, program information is classified to pay information and free information. This program information also includes a flag (ID) representing the genre of the information, a flag (ID) indicating if it is supplemental information or independent information and a flag (ID) indicating if it is pay information or free information.

Each program information is encoded and transmitted at the rate of once per 10 seconds or once per hour, for example. The same data may be repeatedly transmitted multiple times or data may be updated to new one once per hour, for example. In the case of the data renewal, an update flag may be transmitted simultaneously.

The program information encoded by the encoding device 105 is sent to the error correction code affix device 106. The error correction code affix device 106 affixes an error correction code to the input digital data using a product code, and sends the resultant data to the L-MSK modulator 107.

The L-MSK modulator 107 is also supplied with the L signal and R signal. The L-MSK modulator 107 performs L-MSK modulation on the output signal of the error correction code affix device 106 in accordance with the characteristic shown in FIG. 2, and outputs the resultant signal to the multiplex information stereo modulator 101.

The L audio signal and R audio signal are also supplied to the stereo modulator 101. This stereo modulator 101 produces the L+R signal, the pilot signal having a frequency of 19 KHz and the L−R signal. The stereo modulator 101 performs carrier suppression amplitude modulation on the carrier of 38 KHz with the produced L−R signal, thereby producing a subchannel signal. The stereo modulator 101 adds the multiplexed signal, supplied from the L-MSK modulator 107, to the main channel signal comprised of the L+R signal, the pilot signal of 19 KHz and the subchannel signal, and sends the resultant signal to the FM modulator 102.

The FM modulator 102 performs FM modulation of a predetermined carrier with the input signal, and sends the resultant modulated signal to the transmitter 103. The transmitter 103 amplifies the voltage level of the input signal and transmits the amplified signal as a radio wave from the antenna 104.

In this manner, multiplexed information includes a main audio signal like that of music and characters is transmitted as an FM radio wave in the multiplexed form.

Figure 4:
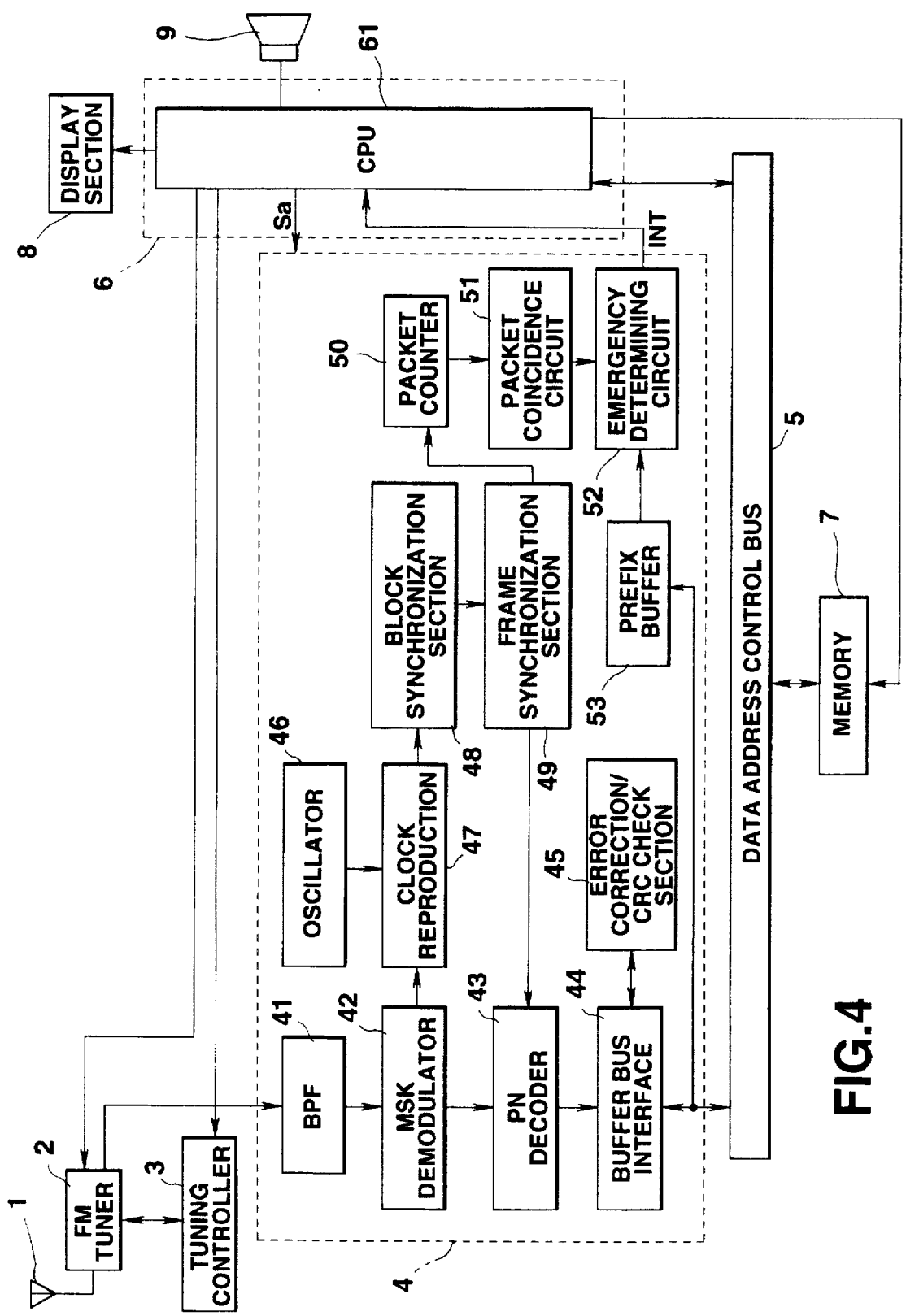
FIG. 4 is a diagram showing the structure of an FM multiplexed broadcast receiving apparatus according to the first embodiment of this invention.

FIG. 4 schematically illustrates the structure of an FM multiplexed broadcast receiving apparatus which receives FM broadcast waves from such an FM multiplex transmitting apparatus.

This receiving apparatus comprises an antenna 1, an FM tuner 2, a tuning controller 3, an FM multiplex decoder 4, a data address control bus 5, a system controller 6, comprised of a CPU 61, a memory 7, a display block 8 and a loudspeaker 9.

The FM multiplex decoder 4 includes a BPF (Band-Pass Filter) 41, an MSK demodulator 42, a PN (Pseudo Noise) decoder 43, a buffer bus interface 44, an error correction/CRC (Cyclic Redundancy Code) check section 45, an oscillator 46, a clock reproduction section 47, a block synchronization section 48, a frame synchronization section 49, a packet counter 50, a packet coincidence circuit 51, an emergency information determining circuit 52, and a prefix buffer 53.

The output of the emergency information determining circuit 52 of the FM multiplex decoder 4 is supplied as an interrupt signal INT to the CPU 61 of the system controller 6. Connected to the CPU 61 are the data address control bus 5, memory 7, display block 8 and loudspeaker 9. The memory 7 and buffer bus interface 44 are connected to the data address control bus 5.

The FM detection signal from the FM tuner 2 is supplied to the BPF 41 in the FM multiplex decoder 4. The BPF 41 extracts only a signal of a 76-KHz band from the supplied signal, and sends the extracted signal to the MSK demodulator 42. The MSK demodulator 42 performs delay detection on the supplied signal to reproduce digital data and sends the reproduced digital data to the clock reproduction section 47 and the PN decoder 43.

The clock reproduction section 47 responsive a clock signal supplied from the oscillator 46, performs a digital PLL (Phase Locked Loop) operation to reproduce a clock synchronous with the digital data reproduced by the MSK demodulator 42. The clock reproduction section 47 sends the digital data and the reproduced clock to the block synchronization section 48. The block synchronization section 48 samples the digital data with the reproduced clock to detect a BIC (Block Identification Code) which will be discussed later and produces a block sync signal synchronous with a block. This block synchronization section 48 sends the block sync signal to the packet counter 50 and frame synchronization section 49. The frame synchronization section 49 detects the transitional point in the type (BIC1 to BIC4) of the BIC (which will be discussed later with reference to FIG. 5), detected by the block synchronization circuit 48, to produce a frame sync signal synchronous with the received frame.

The frame sync signal output from the frame synchronization section 49 is supplied to the packet counter 50.

The packet counter 50, which is reset by the frame sync signal, counts the number of output pulses from the block synchronization section 48. The count value represents the number of data packets in a frame. The packet counter 50 sends this count value to the packet coincidence circuit 51. The packet coincidence circuit 51 serves to detect a previously-specified packet. When the count value (the number of the received packet in one frame) of the packet counter 50 matches with a predetermined value, the packet coincidence circuit 51 sends a coincidence signal to the emergency information determining circuit 52. Based on prefix data (described later) stored in the prefix buffer 53, the emergency information determining circuit 52 determines if emergency information is included in the packet received when the coincidence signal has been output. When the currently received packet includes emergency information, the emergency information determining circuit 52 sends the interrupt signal INT to the CPU 61.

The PN decoder 43 descrambles the data reproduced by the MSK demodulator 42, and sends the descrambled data to the buffer bus interface 44. The buffer bus interface 44 performs error correction and CRC check by means of the error correction/CRC check section 45, and sends the resultant data to the memory 7 and the prefix buffer 53 via the data address control bus 5.

Figure 5:
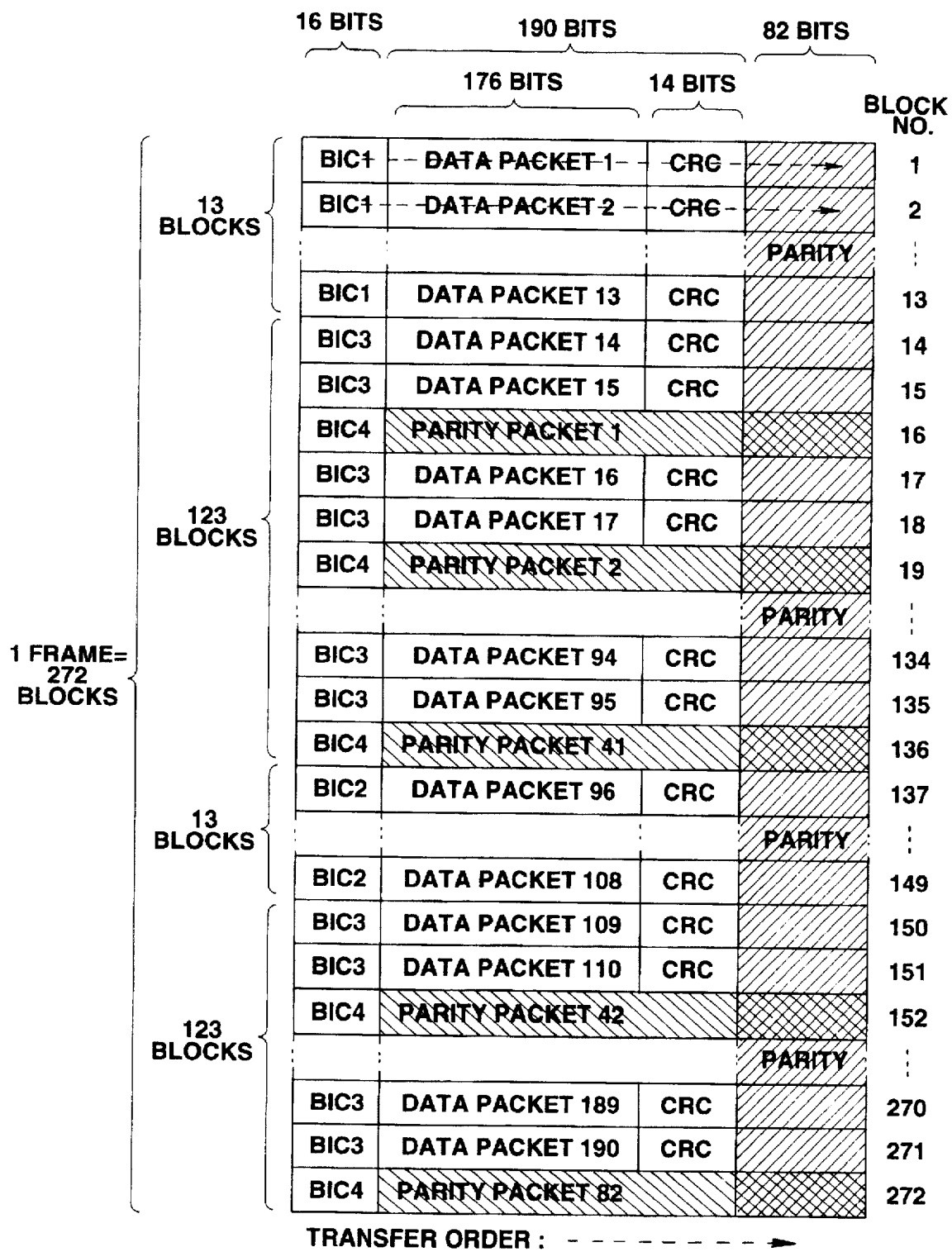
FIG. 5 is a diagram depicting the frame structure of FM multiplexed broadcasting.

FIG. 5 depicts the frame structure of an FM multiplexed broadcast wave which is transmitted from the FM broadcasting station in FIG. 4.

Each frame is comprised of 272 blocks each having a 16-bit BIC affixed to the head as a block ID code. The 16-bit BIC is for establishing the block synchronization and frame synchronization. Of the 272 blocks, 190 blocks serve as data packets for transferring data, and the remaining 82 blocks serve as parity packets for transferring parities in the column direction. The parity packets of the 82 blocks represent the vertical parities of the entire data packets, and are distributed to cope with a burst error.

Figure 7:
FIG. 7 is a diagram of the bit pattern of a block ID code.

The bit pattern of a 16-bit BIC (BIC1 to BIC4) at the head of each block is shown in FIG. 7. Therefore, the timings of switching the packet contents, the end of a frame and the start of a new frame, which have been discussed above referring to FIG. 5, can be discriminated by a change in BIC1 to BIC4. The position of a data packet can be determined by starting counting the number of data packets in synchronism with the frame start timing.

Figure 8:
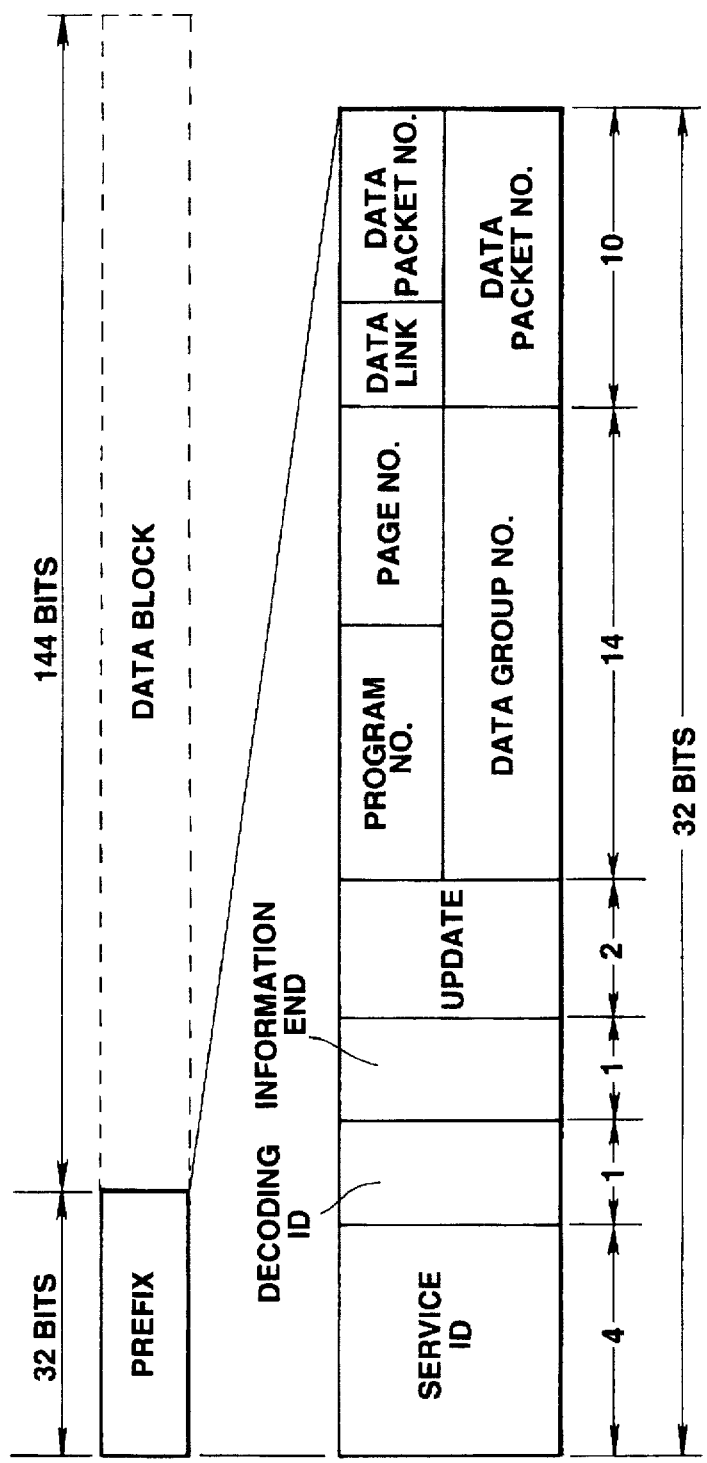
FIGS. 8A–8B are diagrams showing the schematic structure of a data packet constituting a subframe.

Each of data packets constituting each subframe including a total of 176 bits, 32 bits of a prefix, and 144 bits of a data block, as shown in FIG. 8A. Those bits are followed by 14 bits of CRC and 82 bits of a parity, as shown in FIG. 5.

Each 32-bit prefix including a 4-bit service ID code, a 1-bit decoding ID flag, a 1-bit information end flag, a 2-bit update flag, a 14-bit data group number and a 10-bit data packet number, as shown in FIG. 8B.

The 4-bit service ID code represents the type of the content of a program (e.g., character, graphics, traffic information, added information, supplemental signal, operation signal or the like) and the receiving process mode by a binary value.

When the 4-bit service ID code is "1000H" (8), the packet is for the transmission of emergency information. Therefore, "1000H" serves as an emergency information flag indicating that the packet is exclusively for transmitting emergency information.

The 1-bit decoding ID flag is set to "1" when an error corrected output should be made immediately after decoding only in the horizontal direction, and it is set to "0" when such an output should be made after decoding only in both horizontal and vertical directions. The 1-bit information end flag is set to "1" when information ends in a given data group, and is set to "0" otherwise. The 2-bit update flag is incremented by "1" when a data group to be transferred with a given data group number is updated and the updated flag is sent out. When no updating has been made, the same flag as the previously transferred update flag is to be sent out. The data group number including an 8-bit program number and a 6-bit page number. The 8-bit program number specifies a desired program, e.g., traffic information (001) or weather forecast (002), among a maximum of 256 programs, while the 6-bit page number specifies a desired page among a maximum of 64 pages which constitute such a program. The 10 bit data packet number including a 2-bit data link and an 8-bit data packet number. The 8-bit data packet number assigns the order number of a data packet in the same data group or with the same program number; the numbers are sequentially assigned starting from "0." The 2-bit data link serves to divide the same data group to sub groups and treats those sub groups as continuous data groups in the order of the data link codes, when the data packet number exceeds the maximum value (255).

The operation of the FM multiplexed broadcast receiving apparatus with the structure shown in FIG. 4 will be described below.

The FM multiplexed broadcast receiving apparatus according to this embodiment intermittently receives only data packets of a predetermined specific block. In the normal mode, the system controller 6 is powered off, whereas the FM tuner 2 and tuning controller 3 are always enabled to receive data. The entire circuits of the FM multiplex decoder 4 need not be powered on; for example, the PN decoder 43, buffer bus interface 44, error correction/CRC check section 45, prefix buffer 53, and emergency information determining circuit 52 may be powered off in the normal mode and may be powered on only when the system controller 6 is enabled. Further, the data address control bus 5, memory 7 and display block 8 may be designed to be powered on when the system controller 6 is enabled. The CPU 61 of the system controller 6 includes a 16-bit microprocessor which operates at a clock of 16 MHz, for example, and consumes considerable power.

The system controller 6 powers on the FM multiplex decoder 4 with a signal Sa in the initial state, after which the controller 6 is disabled itself.

When an FM multiplex signal is received at the antenna 1, the tuning controller 3 tunes to a station desired by the user, and the FM tuner 2 acquires an FM detection signal and sends it to the FM multiplex decoder 4.

The BPF 41 in the FM multiplex decoder 4 extracts a signal in a 76-KHz band from the FM detection signal, and sends the resultant signal to the MSK demodulator 42. The MSK demodulator 42 performs delay detection on the signal of 76 KHz to reproduce digital data and sends the digital data to the clock reproduction section 47. The clock reproduction section 47 performs a kind of digital PLL operation in response to the clock from the oscillator 46, to reproduce a clock synchronous with the digital data. The block synchronization section 48 samples the digital data in synchronism with the reproduced clock to detect BIC1 to BIC4 in the frame shown in FIG. 5 to produce a block sync signal. The frame synchronization section 49 detects the transitional points in BIC1 to BIC4, detected by the block synchronization circuit 48, to produce a frame sync signal.

The frame synchronization section 49 sends this frame sync signal to the packet counter 50 to reset this counter 50 at the head of each frame. The packet counter 50 counts the number of output pulses from the block synchronization section 48. That is, the packet counter 50 counts the number of data packets in a frame.

The packet coincidence circuit 51 determines if the count value of the packet counter 50 matches with a predetermined value ("3" in this example). When the count value of the packet counter 50 becomes "3," the packet coincidence circuit 51 determines a match of the count value with "3" and sends a coincidence signal to the emergency information determining circuit 52.

Meanwhile, the digital data reproduced by the MSK demodulator 42 is sent via the PN decoder 43 to the buffer bus interface 44 to be subjected to error correction and CRC check in the error correction/CRC check section 45. The resultant data is sent via the data address control bus 5 to the memory 7 to be stored therein. Of this data packet of digital data, prefix data is stored in the prefix buffer 53.

In accordance with the coincidence signal, the emergency information determining circuit 52 acquires prefix data in FIG. 8B of the third packet in each frame from the prefix buffer 53. The emergency information determining circuit 52 determines if the 4-bit service ID code in the obtained prefix data represents emergency information. More specifically, the emergency information determining circuit 52 determines whether or not the 4-bit service ID code in the obtained prefix data is set to "1000H" for emergency information.

If the service ID code is set for emergency information, the emergency information determining circuit 52 determines that the currently received packet contains emergency information and sends the interrupt signal INT to the CPU 61. The CPU 61 is enabled in response to this signal INT.

The CPU 61 acquires the received data, demodulated and error-corrected by the FM multiplex decoder 4, from the memory 7. Based on the obtained data, the CPU 61 constructs data constituting a program, prepares display data and displays the emergency-information carrying program on the display section 8.

In short, when detecting that the service ID code in the prefix data in the data packet with the block No. 3 represents emergency information, this FM receiver builds up (reconstructs) a program which is defined by the data group number of that data packet. The CPU 61 displays the reconstructed program on the display block 8. When, for example, the service ID code represents emergency information and the data group number of the associated data packet is "255," an emergency information program is being broadcast as the 255-th program. The CPU 61 therefore builds up (reconstructs) this 255-th program, and displays the reconstructed program or the emergency information on the display block 8.

Second Embodiment

In the first embodiment, emergency information is exclusively specified by writing "1000H" (emergency information flag) to the 4-bit service ID code in the prefix data in a specific data packet (the third data packet in the first embodiment). This invention is not however limited to this particular style. For instance, emergency information may be specified by using the 14-bit data group number shown in FIG. 8B in which case data indicative of the number of the emergency-information broadcasting program, e.g., "255," is set as a specific number to the 8-bit program number in the data group number shown in FIG. 8B.

Even this modification performs the same operation as the previously discussed first embodiment. When it is determined that the count value of the packet counter 50 coincides with the previously specified packet number "3," the emergency information determining circuit 52 determines if emergency information is included in this packet.

More specifically, the emergency information determining circuit 52 acquires prefix data in FIG. 8B of this packet from the prefix buffer 53, and determines if the 8-bit program number in the data group number is a specific number representing an emergency information program. If the specific number "255" indicative of the emergency information program is set as the program number, the emergency information determining circuit 52 sends the interrupt signal INT to the CPU 61 to enable the CPU 61.

The enabled CPU 61 acquires the received data, demodulated and error-corrected by the FM multiplex decoder 4, from the memory 7, executes the construction of the associated program and the preparation of display data, and displays the emergency information program on the display section 8.

In other words, when the specific number representing the emergency information program is detected as the 8-bit program number in the data group number with the block No. 3, the emergency information program is broadcast on the 255-th program that is defined by the specific number, so that CPU 61 constructs this 255-th program and displays it on the display block 8.

Third Embodiment

Figure 10:
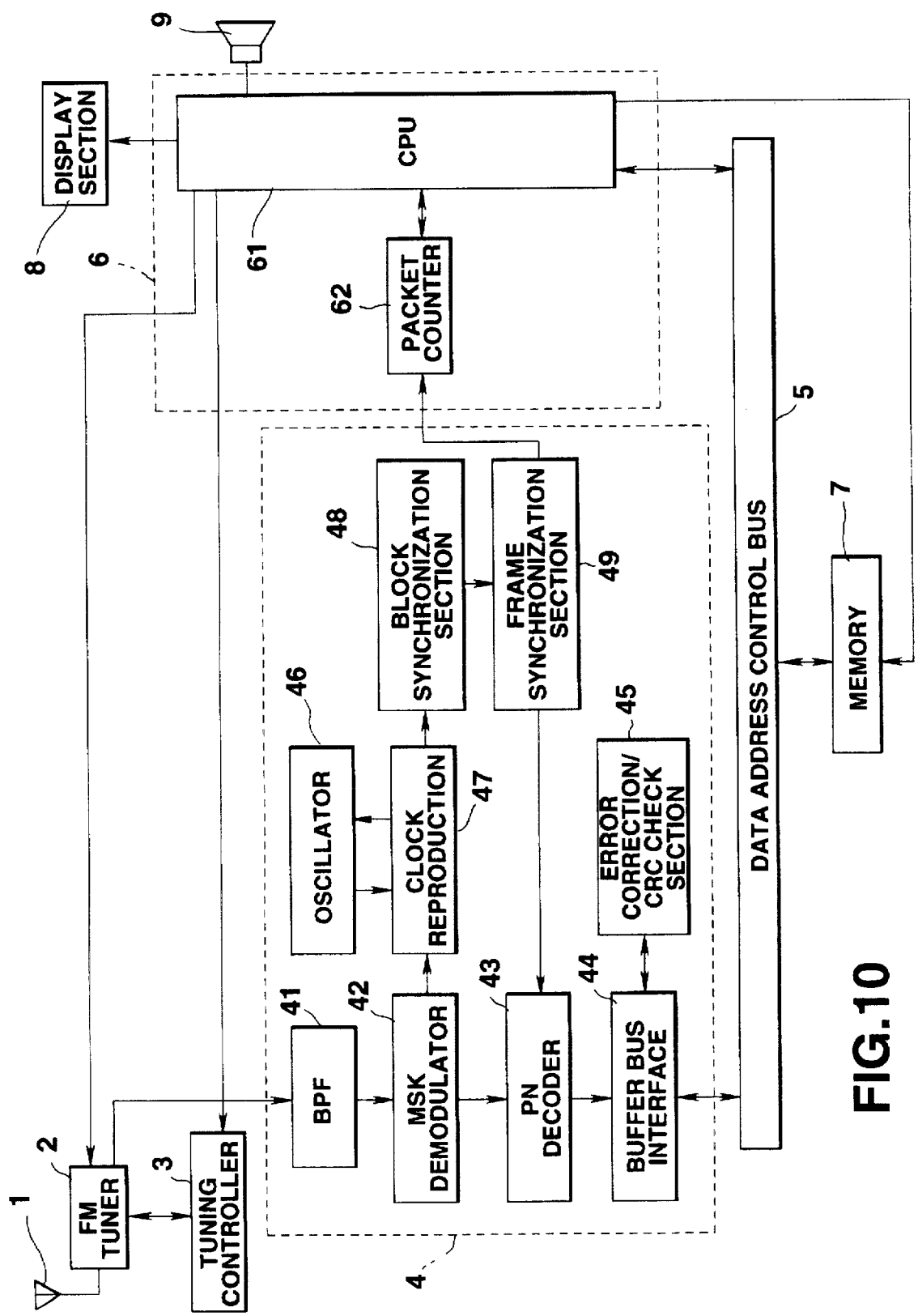
FIG. 10 is a diagram showing the structure of an FM multiplexed broadcast receiving apparatus according to the third embodiment of this invention.

FIG. 10 shows the schematic structure of the third embodiment. Like or same reference numeral as used in FIG. 4 are also used in FIG. 10 to denote corresponding or identical components.

Although the system controller 6 is normally powered off in the first and second embodiments, the system controller 6 is normally activated and the FM multiplex decoder 4 is intermittently powered on in the third embodiment. This structure is advantageous when the consumed power of the FM multiplex decoder 4 is large.

In this embodiment, the system controller 6 has a packet counter 62 in addition to the CPU 61. The packet counter 62 is enabled by the frame sync signal from the frame synchronization section 49 of the FM multiplex decoder 4, and thereafter counts the number of clocks (the number of pulses of an operation clock) of the CPU 61. The packet counter outputs a coincidence signal to the CPU 61 when the count value reaches a predetermined value corresponding to a timing at which the data packet including the emergency information is transmitted and which is sufficient for receiving the data packet of each frame.

Once enabled by the frame sync signal from the frame synchronization section 49, the packet counter 62 counts the number of clocks of the CPU 61. As the time passes, therefore, the difference between the count value of the packet counter 62 and the actual transitional timing of the data packets may increase. In this respect, the CPU 61 activates the FM multiplex decoder 4 every predetermined time by the signal Sa and causes the packet counter 62 to be enabled again by the frame sync signal from the frame synchronization section 49 for synchronous compensation.

In the FM receiver with this structure, the CPU 61 temporarily powers on the FM multiplex decoder 4 with the signal Sa. The FM multiplex decoder 4, like the one in the first embodiment, generates the frame sync signal and sends it to the packet counter 62.

The packet counter 62 is enabled by this frame sync signal and informs the CPU 61 of the event. At this point of time, the CPU 61 powers off the FM multiplex decoder 4 with the signal Sa.

The packet counter 62, when being enabled, counts the operation clocks from the CPU 61.

The packet counter 62 determines if its own count value coincides with a predetermined value which corresponds to a timing enough for receiving the data packet including the emergency information in each frame data. Supposing that the predetermined packet position is "3" as in the above-described embodiments, when the count value of the packet counter 62 becomes the predetermined value corresponding to the third data packet in the frame data, the packet counter 62 sends a coincidence signal to the CPU 61. In response to this coincidence signal, the CPU 61 powers on the FM multiplex decoder 4 again using the signal Sa and determines if the packet which is received at this timing includes emergency information.

This will be discussed below more specifically. The MSK demodulator 42 of the FM multiplex decoder 4 reproduces digital data. The PN decoder 43 performs PN decoding of the reproduced digital data and sends the resultant data to the memory 7 through the buffer bus interface 44 and data address control bus 5. The memory 7 stores the digital data on the bus 5. The prefix data in the digital data is send to the prefix buffer 53. The emergency information determining circuit 52 inputs the service ID code from the prefix buffer 53, and determines if the service ID code in the prefix data in the associated packet indicates emergency information.

If the service ID code is set for emergency information, the emergency information determining circuit 52 determines that the currently received packet contains emergency information and sends the interrupt signal INT to the CPU 61.

The CPU 61 acquires the received data, demodulated and error-corrected by the FM multiplex decoder 4, from the memory 7, reconstructs a program, prepares display data and displays the emergency information on the display section 8.

Fourth Embodiment

Although the foregoing description of the first to third embodiments has been given of the case where character information is to be received as emergency information, a modification may be made to transmit and receive both character information and audio information as emergency information.

Figure 11:
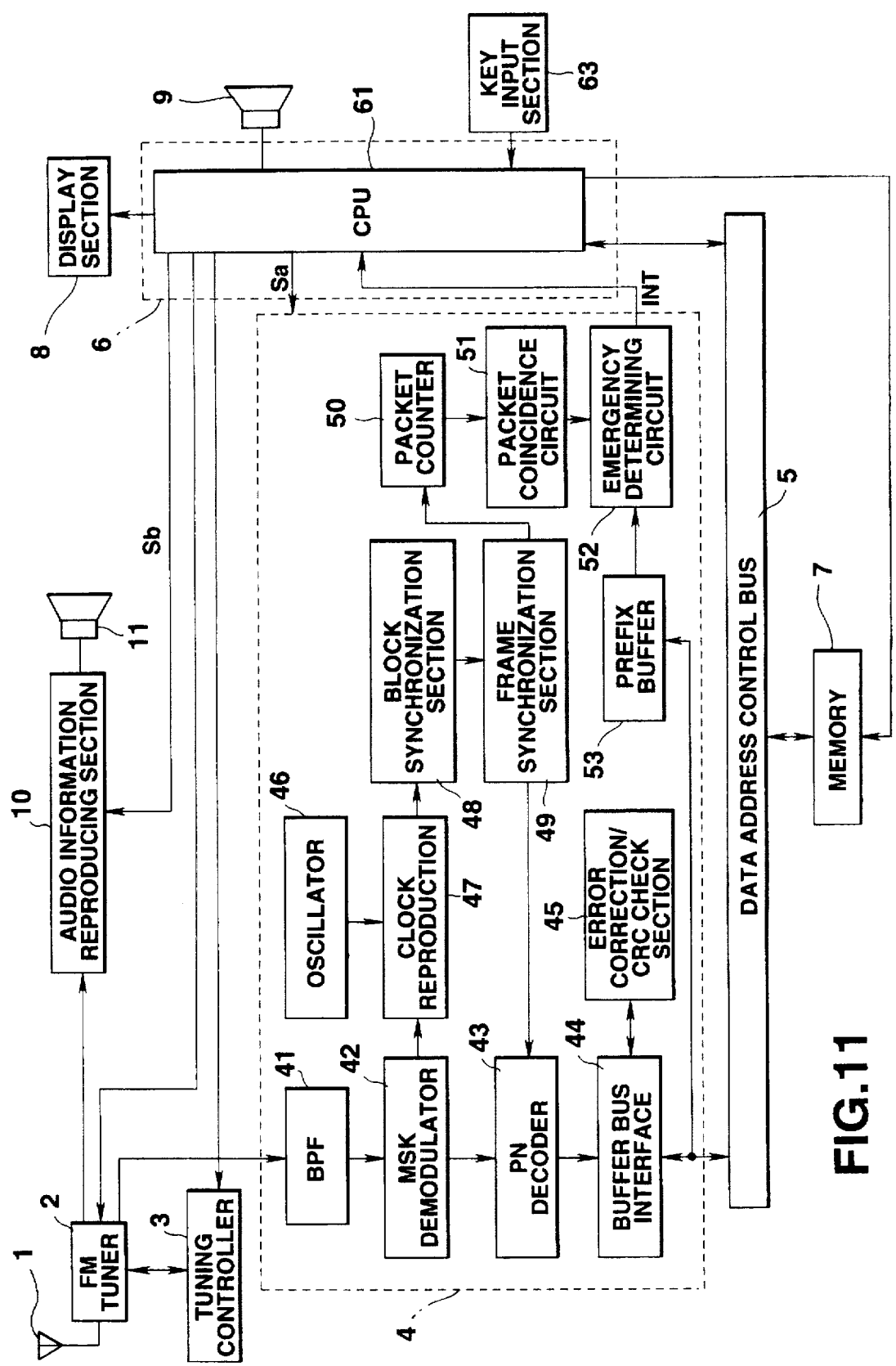
FIG. 11 is a diagram depicting the structure of an FM multiplexed broadcast receiving apparatus according to the fourth embodiment of this invention.

FIG. 11 shows the schematic structure of an emergency information receiving apparatus which receives an FM multiplex broadcast wave including emergency character information and emergency audio information.

This receiver has an audio information reproducing section 10 and a key input section 63 in addition to those components shown in FIG. 4.

The audio information reproducing section 10, which has a stereo demodulator and an amplifier, separates a stereo audio signal in the broadcast audio information demodulated by the FM tuner 2 to right and left signals, which are in turn sent to a loudspeaker 11 via an amplifier. The ON/OFF of the audio information reproducing section 10 is controlled by a signal Sb from the CPU 61.

The key input section 63 is used by the user to perform various key operations such as tuning to a broadcasting station, program selection and page selection, which are performed by an FM radio and a character multiplexed broadcast receiving apparatus. To tune to a desired broadcasting station, the CPU 61 controls the tuning controller 3 in accordance with the performed key operation to thereby adjust the reception frequency of the FM tuner 2.

Figure 12:
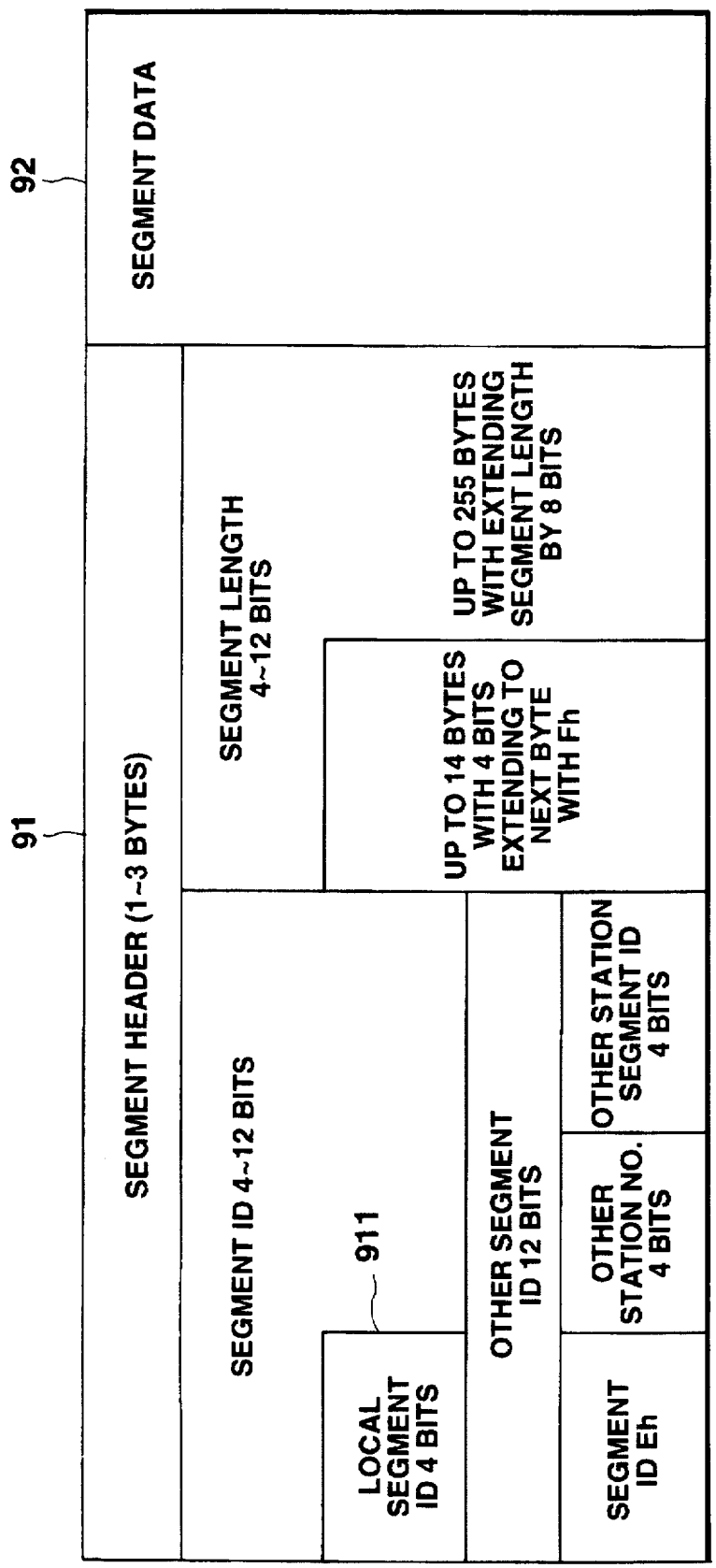
FIG. 12 is a diagram showing a local segment selection area in a data block which constitutes a part of a data packet.

In this embodiment, the 144-bit data block shown in FIG. 8A includes a segment header 91 and segment data 92 as shown in FIG. 12. The segment header 91 has a 4-bit local segment selection area 911 where an emergency audio broadcasting flag indicating that emergency audio broadcasting is currently performed is set.

In transmitting emergency audio information, the stereo modulator 101 in FIG. 3 is supplied with an audio signal to be transmitted, and the encoding device 105 is supplied with information that contains data (emergency audio broadcasting flag), which has the structure as shown in FIGS. 5, 8A, 8B and 12 and whose 4-bit local segment ID data indicates emergency audio information being currently transmitted.

The operation of the FM multiplexed broadcast receiving apparatus with the structure shown in FIG. 11 will be described below.

The FM multiplexed broadcast receiving apparatus according to this embodiment, like that of the first embodiment, intermittently receives only data packets of a predetermined specific block. In the normal mode, the system controller 6 is powered off, whereas the FM tuner 2, tuning controller 3 and FM multiplex decoder 4 are always enabled to receive data.

The system controller 6 powers on the FM multiplex decoder 4 in the initial state, and is then disabled itself. When an FM multiplex signal is received at the antenna 1, the tuning controller 3 tunes to a station desired by the user, and the FM tuner 2 acquires an FM detection signal and sends it to the FM multiplex decoder 4.

The FM multiplex decoder 4 basically operates in the same way as that of the first embodiment, so that when the count value of the packet counter 50 coincides with a predetermined value "3" (the number of the packet which contains emergency information) and the packet coincidence circuit 51 determines the matching of the count value with "3," this circuit 51 sends a coincidence signal to the emergency information determining circuit 52.

In accordance with the coincidence signal, the emergency information determining circuit 52 acquires prefix data in FIG. 8B of the third packet in each frame from the prefix buffer 53. The emergency information determining circuit 52 determines if the 4-bit service ID code in the obtained prefix data is a service ID code representing emergency information (emergency information flag). More specifically, the emergency information determining circuit 52 determines whether or not the 4-bit service ID code in the obtained prefix data is set to "1000H" for emergency information.

If the service ID code is set for emergency information, the emergency information determining circuit 52 obtains prefix data in the next (fourth) packet and determines if the service ID code is for added information. In other words, the circuit 52 determines if the service ID code in the prefix data in the fourth packet is set to "1101H" which represents the exclusive use for added information.

If the service ID code in the prefix data in the fourth packet is not set for the exclusive use for added information, the emergency information determining circuit 52 sequentially detects packets for added information from among the fifth and subsequent packets as in the same manner as has been explained above.

If the service ID code in the fourth packet is designed exclusively for added information, the emergency information determining circuit 52 determines if the emergency audio broadcasting flag is present. More specifically, the circuit 52 makes the decision depending on whether the emergency information flag representing emergency information being currently broadcast is set in the 4-bit local segment selection area 911 in the segment header 91 shown in FIG. 12, which constitutes the data block of the fourth packet.

When the emergency information flag is set in the 4-bit local segment selection area 911 in the segment header 91 of the fourth packet, the emergency information determining circuit 52 determines that the emergency audio broadcasting is currently in progress, and sends the interrupt signal INT to the CPU 61. In response to this signal INT, the CPU 61 is enabled to power on the audio information reproducing section 10. The audio information reproducing section 10 then produces an emergency audio broadcast wave, received by the FM tuner 2, from the speaker 11.

The CPU 61 acquires the received data, demodulated and error-corrected by the FM multiplex decoder 4, from the memory 7. Based on the obtained data, the CPU 61 constructs data constituting a program, prepares display data and displays the emergency-information carrying program on the display section 8.

When the service ID code in the prefix data in the data packet with the block No. 3 represents emergency information, the emergency information is transmitted on the program whose program number is defined by the data group number of that data packet. When the data group number is "255," an emergency information program is being broadcast as the 255-th program. The CPU 61 therefore reconstructs this 255-th program, prepares display data and displays this data on the display block 8.

When the emergency audio broadcasting flag is set in the local segment ID information of the packet which contains added information, the CPU 61 powers on the audio information reproducing section 10 with the signal Db to reproduce audio information.

In the fourth embodiment, when a data packet containing emergency information is detected, the remaining data packets are sequentially searched to detect added information. The position of a data packet containing added information may be previously determined as per the second embodiment. In this case, when the count value of the packet counter 50 becomes a value corresponding to the number of the packet which contains the added information, the emergency information determining circuit 52 acquires the associated data packet and detects the presence/absence of added information.

Fifth Embodiment

Although the system controller 6 operates intermittently in the fourth embodiment, a modification may be made so that the FM multiplex decoder 4 operates intermittently instead as in the third embodiment.

Figure 13:
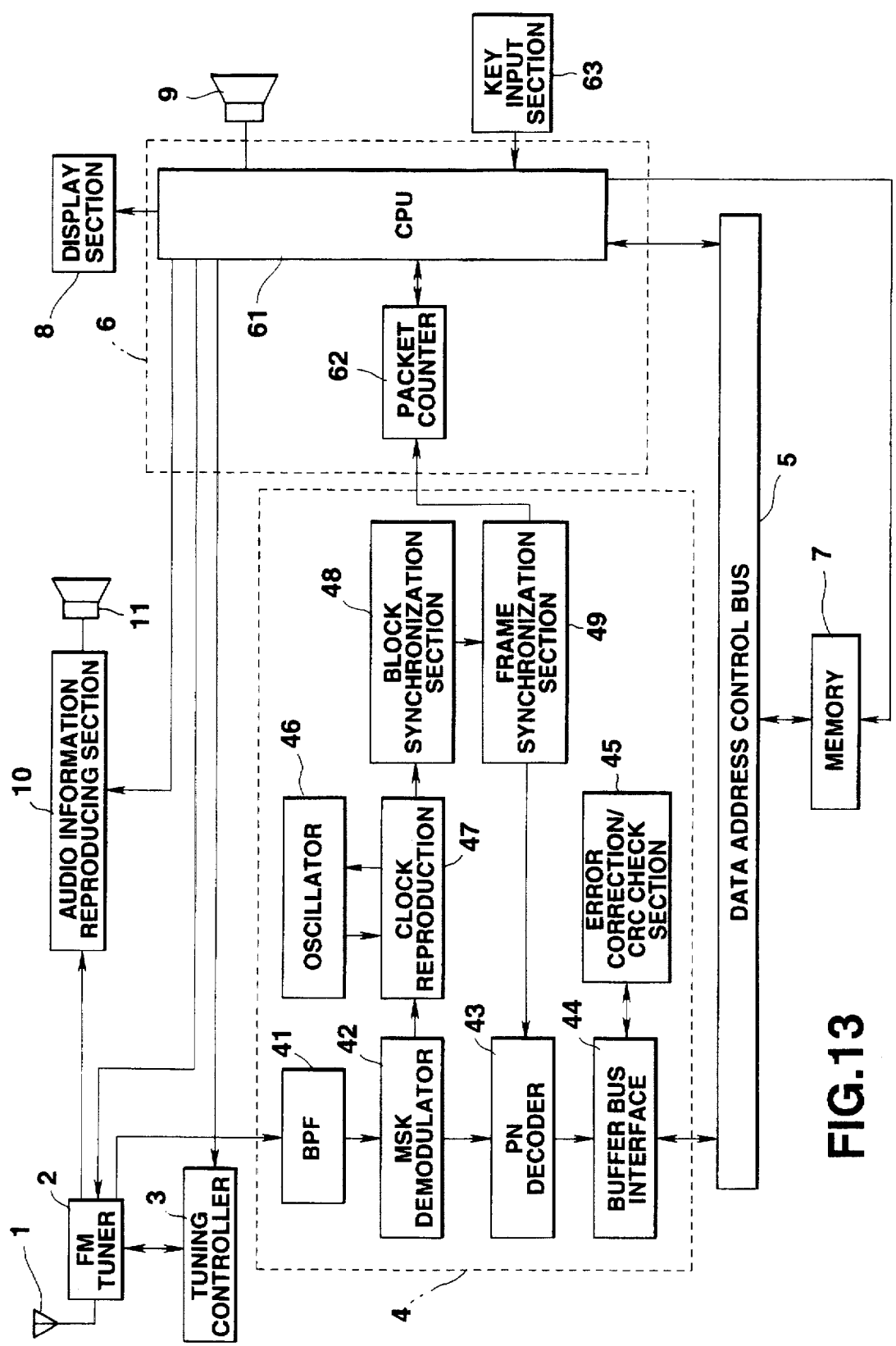
FIG. 13 is a diagram illustrating the structure of an FM multiplexed broadcast receiving apparatus according to the fifth embodiment of this invention.

The fifth embodiment, which can receive emergency audio information by the same structure as that of the third embodiment, has the structure shown in FIG. 13. Like or same reference numeral as used in FIG. 10 are also used in FIG. 13 to denote corresponding or identical components.

In this embodiment, the system controller 6 has a packet counter 62 in addition to the CPU 61. The packet counter 62 is enabled by the frame sync signal from the frame synchronization section 49 of the FM multiplex decoder 4, and thereafter counts the number of clocks of the CPU 61.

In the FM receiver with the structure in FIG. 13, the CPU 61 temporarily powers on the FM multiplex decoder 4. The FM multiplex decoder 4, like the one in the first embodiment, generates the frame sync signal and sends it to the packet counter 62.

The packet counter 62 is enabled by this frame sync signal and informs the CPU 61 of the event. At this point of time, the CPU 61 powers off the FM multiplex decoder 4.

The packet counter 62, when being enabled, counts the clocks from the CPU 61.

The packet counter 62 determines if its own count value coincides with a predetermined value. Supposing that the packet having the emergency information is the third data packet in each frame data as in the first through fourth embodiments, when the count value of the packet counter 62 becomes a value corresponding to packet "3," the packet counter 62 sends a coincidence signal to the CPU 61. In response to this coincidence signal, the CPU 61 powers on the FM multiplex decoder 4 again. The FM multiplex decoder 4 demodulates packet data and sends the resultant data on the data address control bus 5. The CPU 61 acquires the packet data, sent on the data address control bus 5 by the FM multiplex decoder 4, and determines if the service ID code in the prefix data in the associated packet indicates emergency information.

When the service ID code is set for emergency information, the CPU 61 leaves the FM multiplex decoder 4 powered on and determines for the fourth and subsequent packets if the service ID code is set for added information. If the service ID code in the fourth packet is set for added information, for example, the CPU 61 determines whether or not the emergency information flag representing emergency audio broadcasting being currently in progress is present in the local segment selection area 911 in the segment header 91 in FIG. 12 which constitutes the data block of that packet.

When this emergency information flag is set in this area 911, the CPU 61 powers on the audio information reproducing section 10 to cause an emergency audio broadcast wave, received by the FM tuner 2, to be produced from the speaker 11.

The CPU 61 acquires the received data, demodulated and error-corrected by the FM multiplex decoder 4, from the memory 7, reconstructs a program, prepares display data and displays the emergency information on the display section 8. In this case too, when it is detected that the service ID code of the data packet with the block No. 3 is for emergency information, emergency information is being broadcast on the program that is defined by the data group number of that data packet, e.g., the 255-th program, so that the CPU 61 reconstructs this 255-th program and displays it on the display block 8.

When detecting a data packet containing emergency information, the FM multiplexed broadcast receiving apparatus of the fifth embodiment also sequentially searches the remaining data packets for added information. If the location of the data packet containing added information is predetermined, however, when the count value of the packet counter 62 becomes the corresponding value (the number of the packet containing the added information), the associated data packet should be acquired to detect the presence or absence of added information.

According to this invention, as described above, emergency information can be received and informed with lower consumed power so that this invention can be adapted to a battery-powered portable receiver.

The data group number may be used for determining if the emergency information exists as the second embodiment.

Although the key input section 63 is provided only in the fourth and fifth embodiments, such may be provided in the first to third embodiments as well. The circuit blocks may be modified as needed without departing from the scope and spirit of this invention.

What is claimed is:

1. An emergency information transmission method for use in a data transmission system for transmitting frame data including a plurality of blocks, said method comprising the steps of:

preparing at least one block including emergency information;

transmitting a plurality of blocks prepared by said block preparing step, whereby each of said plurality of blocks includes data packets and parity packets, each data packet including prefix data for defining a content of data contained in said data packet and a data block containing data, and at a time of transmitting emergency information, predetermined data indicative of said emergency information is set in said prefix data and a data packet having said prefix data having said predetermined data therein includes data for emergency transmission.

2. The emergency information transmission method according to claim 1, wherein said transmission step includes a step of transmitting said block frequency-multiplexed on an FM broadcast radio wave.

3. The emergency information transmission method according to claim 1, wherein said prefix data has a service identification area for identifying a data content; and said predetermined data is set in said service identification area and a data packet having prefix data in which said predetermined data is set includes data for emergency transmission.

4. The emergency information transmission method according to claim 3, wherein a data packet having said predetermined data in said service identification area is located in a block with a specific number in said frame data.

5. The emergency information transmission method according to claim 1, wherein said prefix data has a data group number area containing a program number and a page number, said predetermined data is set in said data group number area and a data packet having prefix data in which said predetermined data is set includes data for emergency transmission.

6. The emergency information transmission method according to claim 5, wherein a data packet having said predetermined data in said data group number area is located in a block with a specific number in said frame data.

7. The emergency information transmission method according to claim 1, wherein data to be transmitted by said data transmission system includes a plurality of programs, and said data for emergency transmission is located in a specific program.

8. The emergency information transmission method according to claim 1, further comprising a step of preparing emergency audio information; and said transmission step includes a step of transmitting said emergency audio information and said block in a multiplexed form.

9. The emergency information transmission method according to claim 8, wherein said data packet includes prefix data for defining a content of said data packet and a data block, said prefix data having a service identification area for identifying a data content, with added information indicative of presence of said emergency audio information being set in said service identification area.

10. An emergency information receiving apparatus for receiving frame data including a plurality of blocks each including data packets and parity packets, at least one of said blocks including emergency information, and reproducing said emergency information included in said frame data, said apparatus comprising:

intermittent reception means for intermittently receiving a block of a specific number;

detection means for detecting predetermined data representing emergency information included in a data packet in said block received by said intermittent reception means; and emergency information output means for reproducing received data to output said emergency information when said detection means detects said predetermined data;

wherein data to be transmitted by said data transmission system is frequency-multiplexed on an FM broadcast radio wave; and said intermittent reception means includes means for receiving an FM multiplexed broadcast wave.

11. An emergency information receiving apparatus for receiving frame data including a plurality of blocks each including data packets and parity packets, at least one of said blocks including emergency information, and reproducing said emergency information included in said frame data, said apparatus comprising:

intermittent reception means for intermittently receiving a block of a specific number;

detection means for detecting predetermined data representing emergency information included in a data packet in said block received by said intermittent reception means; and emergency information output means for reproducing received data to output said emergency information when said detection means detects said predetermined data;

wherein a data packet includes prefix data for defining said data packet and a data block, said prefix data having a service identification area for identifying a data content, with said predetermined data being set in said service identification area; and said detection means detects said predetermined data in said service identification area.

12. An emergency information receiving apparatus for receiving frame data including a plurality of blocks each including data packets and parity packets, at least one of said blocks including emergency information, and reproducing said emergency information included in said frame data, said apparatus comprising:

intermittent reception means for intermittently receiving a block of a specific number;

detection means for detecting predetermined data representing emergency information included in a data packet in said block received by said intermittent reception means; and emergency information output means for reproducing received data to output said emergency information when said detection means detects said predetermined data;

wherein a data packet includes prefix data for defining said data packet and a data block, said prefix data having a data group number area containing a program number and a page number, said predetermined data being set in said data group number area; and wherein said detection means detects said predetermined data in said data group number area.

13. An information receiving apparatus for receiving frame data including a plurality of blocks each including data packets and parity packets, at least one of said blocks including information, and reproducing said information included in said frame data, said apparatus comprising:

intermittent reception means for intermittently receiving a block of a specific number;

detection means for detecting predetermined data representing information included in a data packet in said block received by said intermittent reception means; and information output means for reproducing received data to output said information when said detection means detects said predetermined data;

wherein audio information is multiplexed on said frame data; and wherein said apparatus further comprises:

audio information detection means for detecting specific data indicative of presence of audio information included in a block received by said intermittent reception means; and audio information reception means for receiving audio emergency information and producing a sound when said audio emergency information detection means detects transmission of said audio information.

14. The information receiving apparatus according to claim 13, wherein a data packet includes prefix data for defining said data packet and a data block, said prefix data has a service identification area for identifying a data content, predetermined data indicative of presence of audio information being set in said service identification area; and said audio information detection means detects if said specific data is set in said service identification area.

15. An emergency information receiving apparatus for receiving frame data including a plurality of blocks each including data packets and parity packets, at least one of said blocks including emergency information, and reproducing said emergency information included in said frame data, said apparatus comprising:

intermittent reception means for intermittently receiving a block of a specific number;

detection means for detecting predetermined data representing emergency information included in a data packet in said block received by said intermittent reception means; and emergency information output means for reproducing received data to output said emergency information when said detection means detects said predetermined data;

wherein said intermittent reception means includes:

reception means for substantially performing a continuous receiving operation; and means which is enabled to acquire and output data received by said reception means, when said detection means detects specific data.

16. An emergency information receiving apparatus for receiving frame data including a plurality of blocks each including data packets and parity packets, at least one of said blocks including emergency information, and reproducing said emergency information included in said frame data, said apparatus comprising:

intermittent reception means for intermittently receiving a block of a specific number;

detection means for detecting predetermined data representing emergency information included in a data packet in said block received by said intermittent reception means; and emergency information output means for reproducing received data to output said emergency information when said detection means detects said predetermined data;

wherein said intermittent reception means includes:

timing determination means for determining a timing at which a block with said specific number is transmitted; and means for receiving said block at said timing determined by said timing determination means.

* * * * *